March 6, 1962   R. K. FRANKLIN ET AL   3,023,618
AUTOMATIC LIQUID METER
Filed Dec. 19, 1957
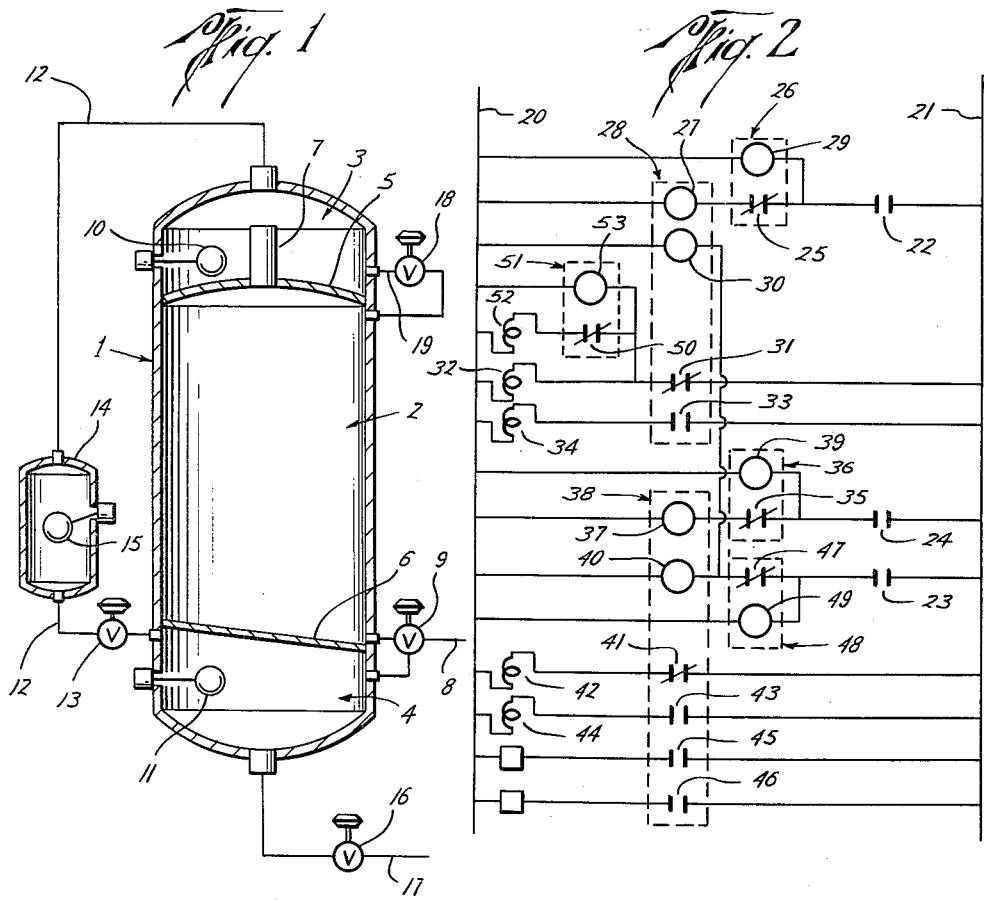
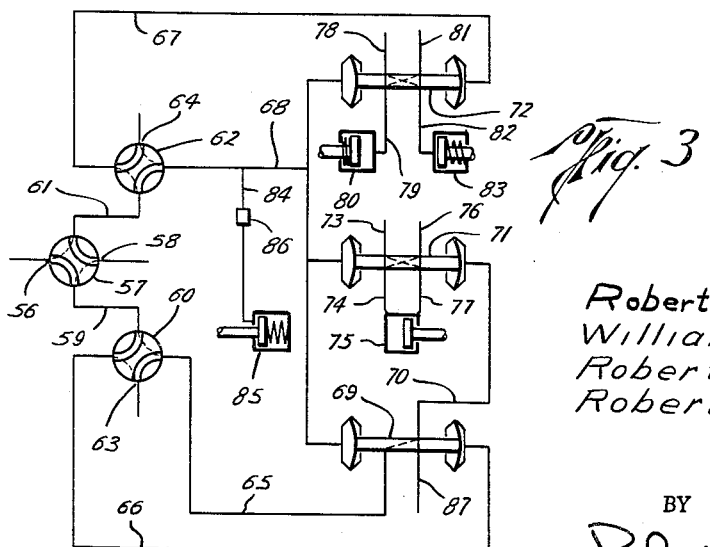
Robert K. Franklin
William M. Boren
Robert N. Crossman
Robert G. Oliphant
INVENTORS
BY
Robert A. White
ATTORNEY

United States Patent Office 3,023,618
Patented Mar. 6, 1962

---

3,023,618
AUTOMATIC LIQUID METER
Robert K. Franklin, William M. Boren, Robert G. Oliphant, and Robert N. Crossman, Houston, Tex.; said Boren, said Oliphant, and said Crossman, assignors to Rolo Manufacturing Company, Houston, Tex., a corporation of Texas
Filed Dec. 19, 1957, Ser. No. 703,782
12 Claims. (Cl. 73—224)

Our present invention relates to an automatic liquid meter which is capable of continuous and substantially errorless operation. It is adapted for use in all installations in which positive accuracy is of primary importance, such as automatic custody transfer units in the field of oil production.

In processing liquids of a high intrinsic value such as oil, accuracy of measurement is essential. This is illustrated by the fact that automatic unsupervised metering seldom is employed when a quality of oil is transferred from the custody of one party to another and payment is based on the number of units so transferred. Rather it has been the practice for the interested parties to be present at the time of transfer in order to verify the quantities. The effort involved in such an operation has created a demand for a meter the reliability and accuracy of which are beyond question.

In the field of liquid measurement, certain principles are well known. A volumetric meter which transfers a series of exact measured volumes is generally conceded to be the most accurate type. However, adaptation of this general type of meter to automatic operation usually involves reliance on float operated switches or devices of a similar nature to govern the operating cycle, and the disability of the floats to respond consistently in continuous operation has barred this type of device from the higher realms of accuracy.

A meter of this general type which fills to the same point at each cycle and then discharges until it is completely empty approaches the desired order of accuracy, but falls short of meeting certain other operating requirements. For example, it is difficult to speed up the operation of such a meter by employing a pump in the meter discharge line because at each cycle the inlet side of the pump will fill with gas or air, and a centrifugal pump would need re-priming before each cycle. In an installation where the meter is emptied by internal gas pressure, some portion of the gas would escape on the heels of the discharging liquid and be lost. Not only is this gas in the liquid discharge line undesirable in itself, but there are many installations in which the gas from a producing well is employed to accelerate the liquid flow, and this gas is frequently limited in amount. A meter which allowed a portion of it to escape at each cycle would soon exhaust the supply. These considerations have led to our present invention, the objectives of which may be briefly stated as follows:

It is an object of our invention to provide an automatic liquid meter which attains continuous positive accuracy of a high order.

It is also an object of our invention to provide an automatic liquid meter which may be discharged by a pump without introducing gases into the system.

It is also an object of our invention to provide an automatic liquid meter which may utilize internal gas pressure for accelerated operaton without allowing gas to escape through the discharge system.

It is a further object of our invention to provide for use with an automatic liquid meter two alternate systems of controls which provide continuous accurate operation without supervision.

In carrying out our invention, we provide a housed unit which has an internal unit volume metering chamber. A positively controlled three-way transfer valve admits fluid into the unit until the metering chamber is entirely full, after which it terminates the flow of incoming liquid and transfers the entire unit volume in the metering chamber into a discharge system which includes a liquid seal chamber. The three-way valve then returns to its first position for a renewal of the cycle.

The structural arrangement whereby a liquid seal is maintained in the discharge system at all times is a very important part of our invention. This feature enables the metering chamber to drain completely at each cycle, thereby providing an assurance of accuracy without causing the undesirable results which have heretofore accompanied this event.

This description taken in conjunction with the accompanying drawings represents a complete disclosure of our best method of accomplishing the objectives of our invention. Referring now to the drawings:

FIG. 1 represents an elevational view of our meter in operating position;

FIG. 2 is a schematic diagram of the electrical control system of our meter which directs automatic operation thereof; and FIG. 3 is a schematic diagram of an alternate pneumatically operated control system for our meter.

The basic structure of our meter illustrated in FIG. 1 comprises an external weatherproof housing 1 which is internally divided into a metering chamber 2 vertically intermediate of an overflow chamber 3 and a liquid seal chamber 4. The chamber division is effected by an upwardly concave partition 5 between chambers 2 and 3 and a slightly tilted partition 6 between chambers 2 and 4. We prefer to tilt the partition 6 some slight distance from the horizontal in order to effect complete draining of the chambers, as will become apparent in subsequent paragraphs. At the center of partition 5 is a cylindrical overflow pipe 7 which provides open communication between chambers 2 and 3.

The unit inlet line 8 interconnects the source of the liquid to be measured, not shown, and the three-way transfer valve 9. With valve 9 initially in its first or meter filling position, the liquid is directed to the metering chamber 2. This flow continues until the amount of liquid in chamber 2 is sufficient to fill and overflow the overflow pipe 7. Chamber 3 begins filling from this overflow and the float 10 situated therein rises with the liquid level. When it reaches its upper position, it produces certain automatic changes in valve positions in the meter. These changes as well as those subsequently produced by the other floats which control operation of the meter shall be described at this time, and the manner in which these changes are accomplished shall be dealt within the portion of this description relating to the two alternate control systems. Here it is sufficient to point out that the arrival of the float 10 at its upper position moves transfer valve 9 to its second or meter dumping position in which position the inlet line 8 is closed and the metering chamber 2 is connected to liquid seal chamber 4. This action marks the beginning of the second or meter dumping portion of the operating cycle.

The three-way transfer valve 9 could be replaced by two two-way valves one of which opens and closes the inlet line 8 and the other of which simultaneously closes and opens a line interconnecting the metering chamber and the liquid seal chamber. The three-way three position valve is preferred to simplify control arrangements and improve accuracy.

The amount of liquid between transfer valve 9 in metering chamber 2 and overflow pipe 7 represents an exact measured volume. This is the unit of measurement which will be discharged from the meter in each cycle of operation. The overflow chamber arrangement insures that the accuracy of measurement is not dependent on float 10, for it is apparent that the unit volume chamber will be exactly filled before any liquid enters chamber 3 to initiate the float controlled action. The liquid which overflows is not discharged with the unit volume, but is measured later as will be described.

The liquid dumping into chamber 4 first lifts liquid seal chamber float 11 to its upward position and then enters the liquid seal chamber vent line 12 which interconnects the liquid seal chamber and the overflow chamber to permit gravity flow between the upper and lower portions of the unit. Line 12 and its associated valve and float chamber can be relieved to atmosphere or the upper part of the unit, as convenient. However, when gas pressure within the unit is utilized to accelerate its operation, the arrangement shown in FIG. 1 is necessary.

The rising liquid passes through vent line valve 13 which is open during this portion of the cycle and enters the auxiliary float chamber 14 which is interposed in vent line 12. When the liquid level within this chamber reaches a sufficient height to lift the auxiliary float 15, the unit enters the third or meter discharging phase of its cycle of operation as a result of the following changes in valve positions directed by float 15.

The vent line valve 13 closes, thereby trapping the liquid in auxiliary float chamber 14 above it. At this time the liquid seal chamber 4 will be completely filled, the tilted partition 6 assuring that no air is trapped in the top of the chamber. The meter discharge valve 16 opens and the unit begins to discharge therethrough into meter discharge line 17. The discharge continues while metering chamber 2 is completely emptied. Again, the tilted partition 6 insures that no pools of liquid are trapped within the bottom of the chamber 2.

When the liquid level within liquid seal chamber 4 has fallen to a sufficient level to drop liquid seal chamber float 11 to its lower position, the meter discharge valve 16 closes, and the transfer valve 9 changes position to again interconnect the meter inlet 8 and the metering chamber 2 and begin anew the meter filling portion of the cycle. At about the same time, the vent line valve 13 opens to allow the liquid which is present in the auxiliary chamber 14 and the vent line 12 to drain into the liquid seal chamber 4.

During the initial phase of this portion of the cycle, the overflow chamber drain valve 18 opens to allow the fluid which has been trapped in overflow chamber 3 to dump into the metering chamber 2 through drain line 19. Shortly thereafter, either as the result of a controlled time delay, or the downward movement of the auxiliary float 15 to its bottom position, the drain valve 18 closes. This returns the meter to the configuration at which this discussion was begun in the meter filling portion of the above described cycle of operation.

The foregoing explanation describes the operation of our invention and indicates the method of accomplishment of its objectives. The unit sequentially discharges from valve 9, the point at which custody of the liquid may be assumed to be transferred, a series of measured volumes which are dependent solely on the volume of chamber 2 and overflow pipe 7 for uniformity. Inaccuracies in overflow chamber float 10 cannot affect complete filling of the metering chamber, and it empties itself completely at each cycle. Further, the volume of the metering chamber will remain constant without being subject to any tendency to accumulate paraffin on its walls and bottom during prolonged operation. This is true because the liquid within this chamber never comes to rest, but is either entering or leaving the chamber at all times. Thus the suspended matter in the liquid never settles out as it would if the liquid reached a quiescent condition.

The liquid seal chamber 4 always contains a certain amount of liquid within it. Here the tendency of the foreign matter in the liquid to settle out will not affect the accuracy of the meter because all liquid is measured before it enters this chamber.

The liquid seal chamber performs a vital function in our invention, because it makes it possible to use a pump or gas pressure in conjunction with our meter for accelerated discharge. As custody of the metered liquid is transferred at valve 9, the liquid forming the seal is the property of the transferee, having already been measured.

It may be pointed out that the meter discharge valve 16 could be considered the point of custody transfer with little loss in accuracy. If this were the case, the accuracy of the meter for one cycle of operation would be dependent on the consistency with which liquid seal chamber float 11 returned to its original downward position at the close of the discharge portion of the cycle. However, each subsequent cycle would decrease the amount of error thereby introduced, because each such intermediate cycle would result in the discharge of an exact unit volume and the total error at the close of a number of cycles would be equal to the volume which represented the difference between the initial position of the float 11 and its position at the close of operations.

To further illustrate this point, if it is assumed that at the beginning of a period of operation the chamber 4 contains a sufficient amount of liquid to constitute a normal seal, i.e., the liquid level coincides with the lower position of float 11, then the first unit volume dumped through valve 9 will be discharged from the meter until float 11 returns to its lower position. Any error in its return will be the measure of the difference between the amount of liquid measured in the metering chamber and that discharged through valve 16. However, if operation is continued for twenty cycles, exactly twenty unit volumes will have been measured and dumped through valve 9, and the difference between the initial and final positions of the float 11 will be the measure of error. Thus this error will be only one twentieth of that present in a one-cycle period of operation. This explanation makes it apparent that in any sizeable transfer operation, the error at the close of the operating period will be negligible by comparison with the total volume transferred.

The auxiliary chamber 14 and float 15 are provided to insure that liquid seal chamber 4 is completely filled before the discharge valve 16 opens. The absence of air or vapor pockets in the upper portion of chamber 4 is a desirable feature in an installation where a pump is employed in the discharge line because it, in effect, unites chambers 2 and 4 and allows the vacuum at the inlet side of the pump to be communicated to the entire volume of fluid to be discharged. However, where the rate of discharge is not sufficiently high compared to the rate at which fluid dumps through transfer valve 9 to create a danger of emptying chamber 4 faster than it can be filled from chamber 2, the auxiliary chamber and float in line 12 can be omitted, and a check valve substituted therefor. In such arrangement, the line 12 could be relieved to atmosphere as noted above.

This alternate embodiment would function as hereinabove outlined with the following changes. The check valve in line 12 is open for upward flow. Thus chamber 4 is relieved to begin filling when transfer valve 9 moves to its meter dumping position. When float 11 reaches its upper position, it accomplishes the changes in valve position which were directed by float 15 in the exemplary embodiment. Thus the discharge valve 16 opens to begin the meter discharge. The check valve in line 12 prevents any reverse flow therethrough, and the fluid which is removed from chamber 4 through the discharge line 17 is replaced by fluid which enters through transfer valve 9. When float 11 returns to its lower position, it accomplishes the valve changes described with respect to the exemplary embodiment and a new cycle begins. This modification simplifies the meter and may be used where the installation conditions permit.

The control system for our meter is intended to provide continuous automatic operation with appropriate safeguards against short cycling or other malfunction. For flexibility of installation, we provide two alternate systems either of which meet the requirements for normal operation. The electrical system shown in FIG. 2 shall be explained first.

FIG. 2 is a schematic drawing arranged for ease of explanation. The various operating circuits are shown between the two main electrical busses 20 and 21 which supply the operating power for the system from an appropriate source, not shown.

The three floats which control the operation of the meter, the overflow chamber float 10, the liquid seal chamber float 11, and the auxiliary float 15, control two position switches 22, 23 and 24, respectively. The overflow chamber float switch 22 closes when the float is in an upper position, the liquid seal chamber float switch 23 closes when the float is in a lower position, and the auxiliary float switch 24 closes when the float is in an upper position.

Assuming the meter to be in the last moments of the filling portion of its cycle, all three floats are down and the transfer valve 9 is in its first or chamber filling position. The incoming liquid has filled chamber 2, overflow pipe 7, and is rising in chamber 3. It soon lifts float 10 to its upper position at which time it closes switch 22. This completes a circuit through the normally closed contact 25 of a time-delay relay 26 and the relay coil 27 of a mechanically latched multipole relay 28. Simultaneously a parallel circuit through the heater coil 29 of the time-delay relay 26 is energized, and after a brief interval the relay changes position to open normally closed contact 25. Thus the multipole relay 28 will be moved from its first or normal position to its second or active position by the closing of switch 22, but due to the action of time-delay relay 26, the relay coil 27 of relay 28 is energized only briefly, after which the relay is free to return to its first position when its latching coil 30 is energized by subsequent control events.

Relay 28 has two contacts which form a part of separate additional circuits. The first of these contacts 31 is normally closed so that its circuit is energized while relay 28 is in its first position. This circuit includes a solenoid 32 which serves to hold valve 9 in its first or meter filling position. This circuit also includes certain control means for the overflow chamber drain valve 18 which produce an opening thereof in the early moments of the meter filling portion of the cycle. This shall be explained in subsequent paragraphs.

The second of the contacts 33 is normally open and includes the solenoid 34 of valve 9 which acts when energized to move the valve to its second or meter dumping position. Thus when the relay 28 moves to its second position, the normally closed contact 31 opens and the solenoid 32 is de-energized. At the same time, the second contact 33 closes to energize solenoid 34 of valve 9 and move the valve to its dumping position.

The metering chamber 2 immediately begins to dump into liquid seal chamber 4 and the liquid level therein rises, lifting float 11 to its upper position to open switch 23. This has no effect on the valve positions, but serves merely to reset the circuits controlled by switch 23, as will become apparent.

The liquid enters auxiliary float chamber 14 through line 12 and raises float 15 to its upper position. At this time switch 24 closes and energizes a circuit which includes the normally closed contact 35 of a second time-delay relay 36, and the relay coil 37 of a second mechanically latched multipole relay 38. This moves relay 38 from its first or normal position to its second or active position. A parallel circuit energizes the heater coil 39 of the time-delay relay 36, and acts, after a brief interval, to open the contact 35 and deenergize the relay coil 37 of relay 38. Thus the relay 38 will remain in its second position until its latching coil 40 is energized by subsequent control events to return it to its first position.

Relay 38 has several, preferably four, contacts in separate parallel circuits. The first of these contacts 41 is normally closed and is located in a circuit which energizes a solenoid 42 of liquid seal chamber vent line valve 13. This solenoid maintains the normally closed valve 13 in an open position until relay 38 moves to its second position at which time contact 41 opens to de-energize the solenoid and allow the valve to close.

The second contact 43 of relay 38 is normally open and is located in a circuit which includes a solenoid 44 of the normally closed meter discharge valve 16. When relay 38 is in its second position, contact 43 closes, the solenoid 44 is energized and the valve 16 opens.

Additional contacts 45 and 46 of relay 38 are provided for the purpose of starting an electric pump coincident with the opening of discharge valve 16, and operating an electric counter or recorder to indicate the operating cycles of the meter. One or both of these contacts may be omitted when the meter is not discharged by pumping and/or when another type of recording system is employed.

When relay 38 moves to its second position, valve 13 closes and discharge valve 16 opens to initiate the meter discharge phase of the operating cycle. Discharge continues until chamber 2 is emptied and the liquid level in chamber 4 falls to a point where float 11 reaches its lower position and closes switch 23. Upon this event, a circuit is energized through the normally closed contact 47 of a third time-delay relay 48, and the latching coils 30 and 40 of relays 28 and 38, respectively. Thus both multipole relays are returned to their first positions. A parallel circuit through the heater coil 49 of time-delay relay 48 opens the contact 47 of time-delay relay 48 after a brief interval so that relays 28 and 38 are free to move again to their second positions when subsequent events so dictate.

When the relays 28 and 38 return to their first positions, contact 31 of relay 28 closes and contact 33 opens. This energizes the solenoid 32 of transfer valve 9 and returns it to a meter filling position. Simultaneously contact 41 of relay 38 closes to energize the solenoid 42 of valve 13 to open this valve and allow the liquid in auxiliary float chamber 14 to fall back into liquid seal chamber 4. In addition, contact 43 of relay 38 opens to de-energize the solenoid 44 of meter discharge valve 16 and allows this valve to close. Contacts 45 and 46 also open to shut off the pump and count a cycle if such items are included in the installation.

When contact 31 of relay 28 closes, it energizes two additional circuits which are in parallel with the solenoid 32 of valve 9. The first of these additional circuits includes the normally closed contact 50 of a fourth time-delay relay 51, and a solenoid 52 which opens the normally closed overflow drain valve 18. The second of these additional circuits includes the heater coil 53 of time-delay relay 51, so that after a brief interval, the normally closed contact 50 will open and de-energize solenoid 52, thereby allowing valve 18 to close. It is necessary to provide a sufficient time-delay in relay 51 to insure that valve 18 remains open long enough to allow the liquid level and float 10 in overflow chamber 3 to fall and open switch 22. The liquid thus discharged from overflow chamber 3 falls back into metering chamber 2 during the early moments of the meter filling operation and contributes to the filling thereof. Thus a portion of the liquid trapped in overflow chamber 3 at each cycle becomes a part of the measured volume in the succeeding cycle.

The completion of the above described operations returns the meter to the point at which this explanation was begun. Automatic operation will continue in this manner so long as liquid is provided through meter inlet 8, and a series of accurately measured volumes will be discharged from the unit.

The pneumatically operated control system is illustrated schematically in FIG. 3. The basic elements of the system consist of three two-position fluid pressure controlling pilot valve devices, three two-position fluid pressure controlled master valve devices and fluid motors for actuating the various valves. The positions of the master valve devices are determined by the pilot valve devices which direct the application of liquid or gas pressure to their operating diaphragms. Appropriate flow paths through the master valve devices control the system. It is to be understood that the valves as pictured are merely illustrative of the general function which they serve. Any conventional valves or combination thereof which establish the indicated flow paths are within the contemplation of our invention.

Referring now to FIG. 3, a suitable amount of system operating liquid or gas pressure from an external source, not shown, is introduced through line 56 to the first pilot valve 57 actuated by vent float 15. This valve has two lines connected thereto which are alternately pressurized from line 56 or relieved through relief line 58 dependent on the position of the valve. The first of these lines is designated by the numeral 59 and terminates in a second pilot valve 60 actuated by overflow float 15. The second of these lines is designated by the numeral 61 and terminates in a third pilot valve 62 actuated by seal float 11. Each of the pilot valves 60 and 62 has two lines connected thereto which are alternately connected with the lines 59 and 61, respectively, or relieved through relief lines 63 and 64, respectively, dependent on the position of the valve. These alternate paths are designated 65 and 66 in the case of pilot valve 60, and 67 and 68 in the case of pilot valve 62.

The solid lines in FIG. 3 illustrate the configuration of each of the three pilot valves which will be referred to as its first position. In all three cases, this position results from the controlling float being in its lower position. The dotted lines indicate the direction of flow when the valves are in their second positions.

When all of the pilot valves are in their first positions, namely, with their actuating floats down, the unit is in the meter filling portion of the cycle. The system operating pressure in line 56 is directed by pilot valve 57 through line 59, pilot valve 60, and line 66. Line 65 is relieved through pilot valve 60 and line 63. Line 68 is relieved through valve 62, line 61, and line 58 to which the latter is connected by pilot valve 57. Line 67 is relieved through line 64 by way of valve 62.

The above described pilot valve system is connected to three master valve devices each of which consists of opposed diaphragms at each end of a sliding valve member. Appropriate flow channels within this member establish certain flow paths therethrough dependent on its position. For ease of explanation, the diaphragms on the left-hand sides of the three master valves will be referred to as the first diaphragms and those on the right as the second diaphragms. The master valve positions which result from pressure on the thus indicated diaphragms shall be similarly designated as the first and second positions, respectively.

As before, the solid lines within the master valve sliding members indicate the flow channels when the valves are in their first positions. The diaphragms of the three master valves are depicted in the configuration which creates the first position. The dotted lines represent the alternate or second paths.

In the last moments of the meter filling portion of the cycle as directed by the pilot valves, the master valve 69 is in its second position, a condition created by the pressure in line 66 being directed against its second diaphragm. Thus the flow through valve 69 is along the dotted path as relief line 65 is connected to line 70, which in turn communicates with the second diaphragm with the second master valve 71. The second diaphragm of the third master valve 72 is relieved through line 67. The first diaphragms of all three master valves are relieved through line 68. Master valves 71 and 72 are in what has been designated as their first positions as a result of pressure conditions which existed earlier in the cycle. These conditions will be made apparent as this explanation proceeds.

When master valve 71 is in its first position, the line 73 which is pressurized from the same pressure source as line 56 or some additional source not shown is connected to line 74 which directs the pressure to one side of an operating diaphragm of differential pressure motor 75 which actuates inlet-outlet valve means 9, thereby maintaining valve 9 in its first or meter filling position. Line 76 which is a relief line is connected through master valve 71 to the line 77 which joins the opposite side of diaphragm 75 of valve 9, thereby relieving it of pressure.

When master valve 72 is in its first position, the line 78 which is pressurized from the same pressure source as line 56 and line 73 or some additional source not shown is connected through valve 72 to line 79 which directs the pressure to the operating side of spring loaded diaphragm 80 forming the actuating motor for meter discharge valve 16, thereby maintaining valve 16 in a closed position. Line 81 which is a relief line is connected through master valve 72 to line 82 which joins the operating side of the spring loaded diaphragm 83 which forms the actuating motor for vent line valve 13. Through this channel the diaphragm 83 is relieved and the valve 13 is maintained in an open position by the spring contained therein.

A line 84 is connected to line 68 and joins the operating side of the spring loaded diaphragm 85 forming the actuating motor for the overflow chamber drain valve 18. As line 68 is relieved during the meter filling operation, the diaphragm 85 is also relieved and the valve 18 is maintained by its self-contained spring in a closed position. A two-way check valve 86 is included in line 84 for a purpose which shall be made apparent in subsequent paragraphs.

Analysis of the last moments of the meter filling condition reveals that transfer valve 9 is in a meter filling position, discharge valve 16 is closed, vent line valve 13 is open, and overflow chamber drain valve 18 is closed. The metering chamber 2 fills and overflows from overflow pipe 7 and soon lifts float 10 to its upper position which moves pilot valve 60 to its second position. The following control system changes are accomplished thereby.

The system pressure from line 56 to line 59 is directed along the dotted path within pilot valve 60 to line 65, and line 66 is relieved through line 63. The second diaphragm in master valve 69 is thus relieved, but the valve does not change position because its first diaphragm is still relieved through line 68. Thus line 65 is still connected to line 70 through valve 69 and pressurizes the second diaphragm of control valve 71 to move it to what has been designated as its second position. This change directs the pressure in line 73 to line 77 and relieves line 74 through line 76, thereby effecting a change in position of transfer valve 9 to its meter dumping position by reciprocating the diaphragm 75 connected thereto. This action causes the metering chamber 2 to begin to dump into the liquid seal chamber 4. All of the other valve positions remain the same.

The meter dumping system configuration continues until the liquid in chamber 4 reaches an elevation sufficient to move liquid seal chamber float 11 into its upper position. This moves pilot valve 62 into its second position, a change which causes no variation in the application of the control system pressure, but merely relieves line 68 through line 64 and line 67 through line 61 and line 58 as shown by the dotted paths within valve 62.

As the liquid level in chamber 4 continues to rise, it moves through vent line 12 and valve 13 into auxiliary chamber 14. The auxiliary float 15 thus will be raised into its upper position to move pilot valve 57 into its second position, at which time the following changes are accomplished.

Line 59 is relieved through line 58 thereby removing the pressure from line 65, line 70 and the second diaphragm of master valve 71. This does not effect a change in position of valve 71 because the first diaphragm thereof is still relieved through line 68. Line 66 is still relieved through line 63. Line 61 is pressurized from line 56, thereby pressurizing line 67 to the second diaphragm of master valve 72. As the first diaphragm of this valve is relieved through line 68, it moves to its second position whereupon the pressure in line 78 is directed to line 82 to operate against the diaphragm 83 of vent line valve 13 and effect the closing thereof. Simultaneously the pressure in line 79 is relieved through line 81 and a self-contained spring operates against diaphragm 80 to direct meter discharge valve 16 to an open position.

At this point the meter discharge begins and continues until such time as chamber 2 is empty and the liquid level in chamber 4 falls to a point at which liquid seal chamber float 11 returns to its lower position.

Pilot valve 62 now returns to its first position where line 67 is relieved through line 64 and line 68 is pressurized. The three control valves 69, 71 and 72 are all moved into their first positions as their first diaphragms are pressurized. At valve 69, line 70 is relieved through relief line 87. At valve 71, line 74 is pressurized and line 77 is relieved, thereby moving transfer valve 9 to its meter filling position. At valve 72, line 79 is pressurized and line 82 is relieved, thereby closing meter discharge valve 16 and opening vent line valve 13.

The pressure in line 68 is communicated through line 84 to the diaphragm 85 of overflow chamber drain valve 18. This pressure overcomes the spring loading and opens valve 18, thereby allowing overflow chamber 3 to drain into metering chamber 2.

As this condition continues, overflow chamber float 10 reaches its lower position and returns pilot valve 60 to its first position. This change has no effect on the control system other than to relieve line 66 through line 59 and line 58, and line 65 through line 63.

When vent line valve 13 opens at the completion of the meter discharge portion of the cycle, the liquid trapped within auxiliary float chamber 14 begins to empty into the liquid seal chamber 4 through vent line 12. When the liquid level within chamber 14 falls to a certain point, the auxilary float 15 reaches its lower position and returns pilot valve 57 to its first position. This returns the entire system to the condition at which this explanation was begun. The operations herein described are completely automatic and will continue as long as fluid is provided through the meter inlet 8.

In the pneumatic control system there are certain features provided to insure that the events herein described occur in proper sequence. When the float 11 reaches its lower position, the pressure in line 68 opens overflow chamber drain valve 18 immediately. Line 68 remains pressurized until the float 15 in auxiliary chamber 14 reaches its lower position and returns pilot valve 57 to its first position. If float 15 changes the position of pilot valve 57 before sufficient liquid has drained from chamber 3 to chamber 2 through valve 18 to allow float 10 to reach its lower position and return valve 60 to its first position, line 68 will be relieved before it is proper for valve 18 to close. Thus some arrangement must be provided to insure that valve 18 remains open a sufficient length of time. The two-way check valve 86 accomplishes this result by allowing full flow to the diaphragm 85 but retarding flow from the diaphragm. When line 68 is relieved, there is a time-delay before the diaphragm 85 is relieved. In this manner it is provided that there is sufficient delay in the closing of valve 18 to insure that the liquid level in chamber 3 falls to a point where float 10 will reset pilot valve 60. This result could be accomplished in other ways. For example, line 19 can be made larger than line 12 to provide a sufficiently high rate of flow from chamber 3 to guarantee against malfunction.

Any conventional counting means may be employed in the pneumatic control system to record the operating cycles of the meter. For example, a mechanically actuated counter could be attached to the operating diaphragm of any of the valves to record one unit upon each reciprocation thereof.

While we have described what is at present considered to be the preferred embodiment of our invention, along with alternate forms of certain subcombinations thereof, it should be understood that we do not wish to be limited thereto since many obvious changes may occur to one skilled in the art. We therefore contemplate by the appended claims to cover all such modifications as fall within the true scope of our invention.

We claim:

1. A control system for an automatic positive volume liquid meter having a unit volume chamber with an inlet thereinto, an overflow chamber above said unit volume chamber, a first liquid level controlled means in said overflow chamber having an upper and lower position, a liquid seal chamber below said unit volume chamber with a discharge outlet therefrom, a second liquid level controlled means in said liquid seal chamber having an upper and lower position, vent conduit means interconnecting said liquid seal chamber and the top of said overflow chamber, a third liquid level controlled means in said vent conduit means having an upper and lower position, a first valve means adapted in a first position to open said inlet and in a second position to close said inlet and interconnect said unit volume chamber and said liquid seal chamber, a second valve means adapted in a first position to open said discharge outlet and in a second position to close said discharge outlet, a third valve means in said vent conduit means between said seal chamber and said third liquid level controlled means, said third valve means being open in a first position and closed in a second position, a fourth valve means adapted in a first position to interconnect said overflow chamber and said unit volume chamber, said fourth valve means being closed in a second position, time-delay means operatively connected to said fourth valve means whereby said fourth valve means is automatically returned to said second position after a brief predetermined period in said first position; and a control system comprising a source of fluid pressure; a first, second and third fluid pressure operated means operatively connected to said first, second and third valve means, respectively, and adapted selectively to direct said first, second and third valve means to said first and second positions; a fourth fluid pressure operated means operatively connected to said fourth valve means and adapted to direct said fourth valve means to said first position; a first fluid pressure control means interconnecting said source and said first fluid pressure operated means and operatively connected to said first liquid level controlled means whereby said first fluid pressure operated means moves said first valve means to said second position when said first liquid level controlled means is in said upper position; a second fluid pressure control means interconnecting said source and said second and third fluid pressure operated means and operatively connected to said third liquid level controlled means whereby said second fluid pressure operated means moves said second valve means to said first position and said third fluid pressure operated means moves said third valve means to said second position when said third liquid level controlled means is in said upper position; a third fluid pressure control means interconnecting said source and said first, second, third and fourth fluid pressure operated meansa and operatively connected to said second liquid level controlled means whereby said first fluid pressure operated means moves said first valve means to said first position, said second fluid pressure operated means moves said second valve means to said second position, said third fluid pressure operated means moves said third valve means to said first position, and said fourth fluid pressure operated means moves said fourth valve means to said first position when said second liquid level controlled means is in said lower position.

2. An automatic liquid meter comprising a metering chamber having outlet and inlet means, valve means for said inlet and outlet means, liquid level responsive means operatively connected to said valve means and adapted when said chamber is filled with liquid simultaneously to close said inlet valve means and open said outlet valve means, liquid seal chamber means at least in part below said metering chamber and connected to said metering chamber outlet means, said liquid seal chamber means being vented in its upper portion and having a discharge passage with a control valve, liquid level controlled means in said seal chamber means operatively connected to said discharge control valve and adapted upon the arrival of the liquid level within said liquid seal chamber means at a predetermined upper level above the bottom of said metering chamber to open said discharge control valve and, upon the arrival of the liquid level within said liquid seal chamber means at a predetermined low level below said metering chamber substantially simultaneously to close said discharge control valve and shift said valve means to close said metering chamber outlet means and open said metering chamber inlet means.

3. An automatic liquid meter comprising a metering chamber having outlet and inlet means, liquid level controlled valve means responsive to overflow filling of said chamber simultaneously to close said inlet and open said outlet means, a chamber for receiving liquid overflowing said metering chamber, a valve controlled normally closed drain from said overflow chamber to said metering chamber, liquid seal chamber means at least in part below said metering chamber and connected to said metering chamber outlet, said liquid seal chamber means having a vent in the upper portion thereof and a discharge passage adjacent the bottom thereof, level sensitive valve means responsive to a predetermined high liquid level in said seal chamber means above the bottom of said metering chamber to open said discharge passage, and second level sensitive valve means responsive to predetermined low liquid level in said seal chamber means below said metering chamber to substantially simultaneously close said discharge passage, close said metering chamber outlet means, open said metering chamber inlet and open said overflow chamber drain to restart the metering cycle.

4. An automatic liquid meter comprising a metering chamber having inlet and outlet means and valve means, selectively controlling said inlet and outlet means, an overflow chamber in communication with the top of said metering chamber and having a drain outlet, a normally-closed valve in said drain outlet, first liquid level controlled means in said overflow chamber and operatively connected to said valve means so as, upon the arrival of the liquid level within said overflow chamber at a predetermined level, simultaneously to close said inlet means and open said outlet means, liquid seal chamber means at least in part below said metering chamber and connected to said metering chamber outlet means, said liquid seal chamber means having a vent in its upper portion and a discharge passage adjacent the bottom thereof, a control valve for said discharge passage, a second liquid level controlled means in said liquid seal chamber means and adapted when said liquid seal chamber means is filled with liquid to a predetermined high level above the bottom of said metering chamber to open said discharge passage valve, and a third liquid level controlled means in said liquid seal chamber means and operatively connected to said metering chamber inlet and outlet valve means and said drain valve so as, upon the arrival of the liquid level within said liquid seal chamber means at a predetermined lower level below said metering chamber, substantially simultaneously to close said discharge passage valve, close said metering chamber outlet valve means, open said metering chamber inlet valve means, and open, briefly, said normally-closed drain valve.

5. An automatic liquid meter for volatile liquids comprising a metering chamber having top and bottom metering levels, inlet and outlet means for said metering chamber and control valve means therefor, an overflow chamber having inlet and drain connections with said metering chamber, said inlet connection communicating with said metering chamber at said top level, a drain valve in said drain connection, a seal chamber below said metering chamber and communicating through said outlet with said metering chamber at said bottom level, a venting chamber above said seal chamber and having a connection with the upper portion thereof and a vent at its top, said vent chamber being above the bottom of said metering chamber, a vent valve in said vent chamber connection, a discharge passage at the lower part of said seal chamber and a discharge valve therefor, floats, respectively, in said overflow, seal, and vent chambers, and control means actuable, respectively, by said floats and operatively interconnecting said floats with said valve means, said drain valve, said vent valve, and said discharge valve for sequentially causing positioning of said valve means to open said metering chamber inlet so as to fill said metering chamber to overflowing, to shift said valve means and thereby dump said metering chamber into said seal and vent chambers when said overflow float lifts, to close said vent connection valve and, substantially simultaneously, to open said discharge valve, when both said seal and vent chamber floats are lifted, and thereby discharge the metered liquid, to reclose said discharge valve, open said vent connection valve and shift said valve means to reopen said inlet and close said outlet when said seal chamber float drops, and, thereupon, to temporarily open said drain valve to repeat the metering cycle.

6. An automatic meter for volatile liquids comprising a metering chamber having top and bottom metering levels, inlet and outlet means adjacent said bottom level, control valve means for said inlet and outlet means, an overflow chamber communicating with said metering chamber at said top level and also having an overflow drain connection therewith, a drain valve in said drain connection, a seal chamber below said metering chamber and extending at least slightly above the bottom thereof, a vent in the upper portion of said seal chamber, said seal chamber communicating with said metering chamber through said outlet means, a discharge line connected to said seal chamber and a discharge valve therein, level responsive means, respectively, in said overflow and seal chambers and operative connections between said level responsive means and said drain and discharge valves and said valve means constructed and arranged, sequentially, to position said valve means for opening said inlet means and closing said outlet means to start the metering cycle, to shift said valve means to close said inlet means and open said outlet means for dumping said metering chamber upon lifting of said overflow chamber level responsive means, to open said discharge valve upon filling of said seal chamber to a predetermined upper level at least as high as the metering chamber bottom, to close said discharge valve when the liquid in said seal chamber reaches a predetermined lower level, to reshift said valve means to open said inlet and close said outlet, and, momentarily, to open said drain valve, to restart the metering cycle.

7. Liquid metering apparatus as described in claim 6 further including a vent passage extending from said vent to the upper part of said overflow chamber.

8. An automatic liquid meter comprising a unit volume chamber having inlet and outlet means, an overflow chamber above said unit volume chamber, overflow conduit means extending upwardly from the top of said unit volume chamber into said overflow chamber to establish open communication therebetween, a drain connection between said overflow and unit volume chambers, liquid seal chamber means in part below and in fluid communication with the lower part of said unit volume chamber through said outlet means and having a discharge outlet, a gas vent in the wall of said seal chamber, valve means controlling said inlet and outlet means, a discharge valve adapted normally to close said discharge outlet, a drain valve controlling said drain connection, a first liquid level controlled means within said overflow chamber and operatively connected to said inlet and outlet valve means so as, upon arrival of the liquid level within said overflow chamber at a predetermined level below the top of said overflow conduit means, to position said valve means to close said inlet means and open said outlet means for dumping said unit volume chamber, and a second liquid level controlled means within said liquid seal chamber means and operatively connected to said valve means, said drain valve, and said discharge valve so as, upon the arrival of the liquid level within said seal chamber means at a predetermined upper level, to open said discharge valve and, upon arrival of the liquid level within said seal chamber means at a predetermined lower level below said unit volume chamber, simultaneously, to allow said discharge valve to close, to move said valve means to close said outlet means, to re-open said inlet means, and to briefly open said drain valve.

9. An automatic liquid meter as described in claim 8 further including electric motors operatively connected to said inlet and outlet valve means, said drain valve, and said discharge valve, current controlling switches controlled, respectively, by said first and second level controlled means, a source of electrical energy, and circuits connecting said source, said switches and said motors for controlling said valve means and said valves as described.

10. An automatic liquid meter comprising a unit volume chamber having inlet and outlet means, an overflow chamber adjacent said unit volume chamber, overflow conduit means extending upwardly from the top of said unit volume chamber into said overflow chamber to establish open communication therebetween, a drain connecting the bottom of said overflow chamber and said unit volume chamber, liquid seal chamber means in part below and in part above the bottom of said unit volume chamber, said seal chamber means being connected to said unit volume chamber through said outlet means and having a vent at the top and a discharge outlet adjacent the bottom thereof, valve means controlling said inlet and outlet means, a discharge valve adapted normally to close said discharge outlet, a normally-closed drain valve controlling said drain connection, a first liquid level controlled means within said overflow chamber and operatively connected to said inlet and outlet valve means so as, upon the arrival of the liquid within said overflow chamber at a predetermined level below the top of said overflow conduit means, to position said valve means to close said inlet means and open said outlet means for dumping said unit volume chamber, a second liquid level controlled means in said liquid seal chamber means and operatively connected to said discharge valve so as to open the same when said liquid seal chamber means is sealed with liquid, and a third liquid level controlled means within said liquid seal chamber and operatively connected to said inlet and outlet valve means and said discharge valve so as, upon the arrival of liquid level within said liquid seal chamber means at a predetermined lower level below said unit volume chamber, substantially simultaneously, to allow said discharge valve to close, to move said valve means to close said outlet means and open said inlet means and, briefly, to open said drain valve.

11. An automatic liquid meter comprising a sealed housing with a top and bottom, a lower partition within said housing effecting the internal division thereof into a lower liquid seal chamber and an upper chamber, an upper partition within said upper chamber effecting the division thereof into a unit volume chamber and an overflow chamber, an overflow pipe extending upwardly from said upper partition to interconnect said unit volume chamber and said overflow chamber, a drain connection between said overflow and unit volume chambers, liquid inlet and outlet means for said unit volume chamber, said outlet means interconnecting said unit volume chamber and said seal chamber, a liquid discharge outlet adjacent the bottom of said seal chamber, vent conduit means interconnecting said liquid seal chamber and the top of said overflow chamber, valve means controlling said inlet and outlet means, a discharge valve controlling said discharge outlet, a drain valve controlling said drain connection, a vent valve in said vent conduit means, a first liquid level controlled means within said overflow chamber operatively connected to said inlet and outlet valve means so as, upon the arrival of the liquid level within said overflow chamber at a predetermined level below the top of said overflow pipe, to position said valve means to close said inlet means and open said outlet means, a second liquid level controlled means in said vent conduit means above said vent valve and operatively connected to said vent and said discharge valves so as to close said vent valve and open said discharge valve upon the arrival of the liquid level within said vent conduit means at a predetermined upper level above the bottom of said unit volume chamber, and a third liquid level controlled means within said liquid seal chamber operatively connected to said inlet and outlet valve means and said vent, drain, and discharge valves so as, upon the arrival of the liquid level within said liquid seal chamber at a predetermined lower level, substantially simultaneously to move said valve means to close said outlet means and re-open said inlet means, to close said discharge valve, to open said drain valve and to re-open said vent valve for restarting the metering cycle.

12. An automatic, positive-volume liquid meter comprising a unit volume chamber with inlet and outlet means, an overflow chamber for receiving excess liquid from said unit volume chamber, a drain connection between said overflow chamber and said unit volume chamber, an overflow float in said overflow chamber, a liquid seal chamber below and in fluid communication with said unit volume chamber through said outlet means and having a discharge outlet, a seal chamber float in said liquid seal chamber, a vent communicating with the upper part of said seal chamber, a vent chamber in said vent, a vent float in said vent chamber, inlet and outlet valve means controlling said inlet and outlet means, a discharge valve controlling said discharge outlet, a drain valve controlling said drain connection, time delay means operatively connected to said drain valve whereby said drain valve is automatically closed after a brief, predetermined period in open position, and a control system comprising a source of fluid pressure, fluid pressure motors operatively connected, respectively, to said inlet-outlet valve means, said discharge valve, and said drain valve, a first pressure control device for the motor controlling said inlet and outlet valve means, a second pressure control device for the discharge valve actuating motor, a third pressure control device for controlling said first control device, pressure control devices actuated, respectively, by each of said overflow, seal, and vent floats, and pressure fluid ducting connecting said pressure source and all of said pressure control devices and said motors whereby when the liquid in said overflow chamber reaches a predetermined upper level, said valve means will be actuated to close said inlet means and open said outlet means to dump said metering chamber into said seal chamber, when said seal and vent floats are lifted said discharge valve will be opened, and when said seal float drops said discharge valve will close, said inlet-outlet valve means will be shifted to open said inlet means and close said outlet means, and said drain valve will momentarily be opened to restart the cycle.

References Cited in the file of this patent

UNITED STATES PATENTS

| | | |
|---|---|---|
| 1,665,093 | Gouvion | Apr. 3, 1928 |
| 1,740,875 | Porte | Dec. 24, 1929 |
| 2,831,350 | Banks et al. | Apr. 22, 1958 |
| 2,872,817 | Pitts | Feb. 10, 1959 |

OTHER REFERENCES

An article entitled "Automatic Custody Transfer in Texas" in the Oil and Gas Journal, pages 122 and 123, July 30, 1956.

An article entitled "How Production Controls Work," by L. M. Hubby in the Oil and Gas Journal, pages 94–97 March 26, 1956. (Copies of both publications are in the Scientific Library of the U.S. Patent Office.)